United States Patent [19]

Le Grand et al.

[11] 4,204,026

[45] May 20, 1980

[54] GLASS-POLYCARBONATE LAMINATES

[75] Inventors: Donald G. Le Grand, Burnt Hills, N.Y.; Gina G. Vitale, Arlington, Va.

[73] Assignee: General Electric Company, Pittsfield, Mass.

[21] Appl. No.: 962,624

[22] Filed: Nov. 21, 1978

[51] Int. Cl.² .................... B32B 17/10; B32B 27/08
[52] U.S. Cl. .............................. 428/409; 428/412; 428/447; 428/448; 428/451; 428/911
[58] Field of Search ............... 428/412, 447, 448, 429, 428/451, 911, 409

[56] References Cited

U.S. PATENT DOCUMENTS

| 3,520,768 | 7/1970 | Peilstocker et al. | 428/332 X |
|---|---|---|---|
| 3,650,808 | 3/1972 | Gagnon | 428/412 |
| 3,666,614 | 5/1972 | Snedeker et al. | 428/412 |
| 3,933,407 | 1/1976 | Tu et al. | 427/164 X |
| 3,996,195 | 12/1976 | Sato et al. | 427/387 |
| 4,024,306 | 5/1977 | Takamizawa et al. | 428/412 |
| 4,027,072 | 5/1977 | Molari | 428/412 |
| 4,123,588 | 10/1978 | Molari | 428/412 |
| 4,126,730 | 11/1978 | Molari | 428/412 |

Primary Examiner—Harold Ansher
Attorney, Agent, or Firm—Myron B. Kapustij; William F. Mufatti

[57] ABSTRACT

A glass-polycarbonate laminate wherein the glass layer is bonded to a polycarbonate layer by means of a bonding system comprised of an aminoalkyl[poly(aryloxysiloxane)] primer and an organopolysiloxane-polycarbonate block copolymer bonding agent.

8 Claims, 2 Drawing Figures

GLASS-POLYCARBONATE LAMINATES

The present invention relates to polycarbonate-glass laminates. More particularly, it relates to such laminates which include a primer layer of an aminoalkyl[poly(aryloxysiloxane)] and a bonding layer of a polyorganosiloxane-polycarbonate block copolymer disposed between the glass and polycarbonate layers.

BACKGROUND OF THE INVENTION

The use of so-called safety glazing or penetration resistant glazing for windows, windshields and the like utilizing polycarbonate resin layers as a structural component is well known. For example, glass polycarbonate resin laminates are described in U.S. Pat. No. 3,666,614, the glass and polycarbonate being cohered together using an ethylene-vinyl acetate copolymer. In U.S. Pat. No. 3,520,768, there are described laminates of relatively thick glass having a comparatively thin polycarbonate foil as the cohering material. It is also known to utilize certain polysiloxane polycarbonate block copolymers described more particularly hereinafter as the adhesive layers.

However, due to the difficulty of bonding glass to other materials generally, and polycarbonate resin specifically, in many cases, it has not previously been possible to provide entirely satisfactory glass-polycarbonate laminates which contain the requisite degree of clarity and will not delaminate under actual use conditions, particularly upon exposure to weather and high humidity. The identification of a proper adhesive for bonding glass to polycarbonate resins to produce laminates useful as glazing presents a particularly difficult problem since the bonding agent must not detract from the optical clarity of the glass-polycarbonate laminate; must durably bond glass and the polycarbonate; and must not deleteriously affect the polycarbonate, i.e., must be compatible with the polycarbonate.

The present invention provides a glass-polycarbonate laminate wherein the laminate has good optical properties, the glass is tightly and durably bonded to the polycarbonate, and the bonding agent is compatible with the polycarbonate.

DESCRIPTION OF THE INVENTION

Figure 1:
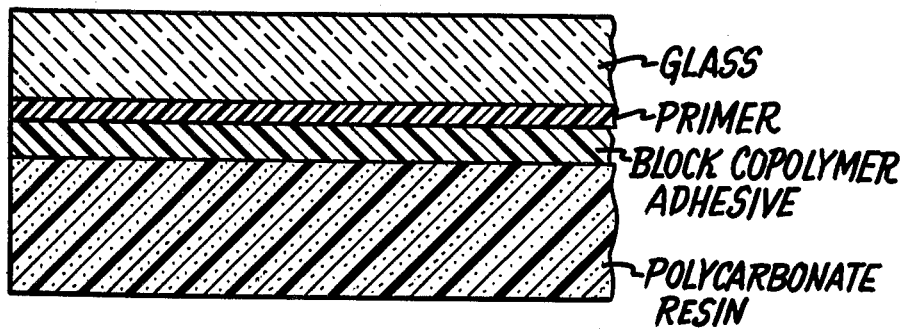
FIG. 1 is a side view of a one-ply glass/one-ply polycarbonate resin of the present invention with the primer layer and bonding layer disposed between the glass and polycarbonate plies.

The instant invention comprises a glass-polycarbonate laminate wherein the glass and polycarbonate laminae are bonded together by means of a bonding system comprised of an aminoalkyl tris[poly(aryloxysiloxane)] primer and an organopolysiloxane-polycarbonate block copolymer bonding agent.

Generally, any polycarbonate resin can be used in the laminate of the present invention including but not limited to those described in U.S. Pat. Nos. 3,161,615; 3,220,973; 3,312,659; 3,312,660; 3,313,777, 3,666,614; 3,989,672, among others, all of which are incorporated herein by reference. Generally, a carbonate polymer used in the instant laminates is an aromatic carbonate polymer having recurring units of the formula:

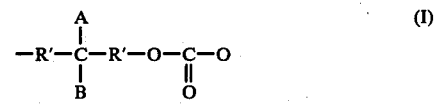

wherein each —R'— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

Also included herein are branched polycarbonates wherein a polyfunctional aromatic compound is reacted with the dihydric phenol and carbonate precursor to provide a thermoplastic randomly branched polycarbonate wherein the recurring units of formula I contain branching groups.

Exemplary polycarbonate resins are those derived from the reaction of bisphenol-A and phosgene. These polycarbonates have from 10–400 recurring units of the formula:

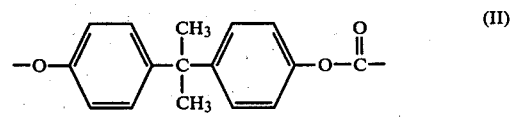

Any of the usual types of glass used in so-called safety applications can be used in conjunction with the present invention including coated or uncoated and chemically and thermally strengthened or tempered glass as well as common untempered glass where indicated.

An example of the chemically tempered glass is that which has been treated chemically with salts in an ion-exchange type process to give a higher tensile and fluxural strength glass. A glass treating process of this type is disclosed in U.S. Pat. No. 3,395,998. Tempered glasses are available commercially and are sold by companies such as Pittsburgh Plate Glass Company of Pittsburgh, Pa., and Corning Glass Works of Elmira, N.Y.

The organopolysiloxane-polycarbonate block copolymers are known compounds which are described in U.S. Pat. Nos. 3,189,662; 3,821,325; and 3,832,419, all of which are incorporated herein by reference.

These polysiloxane-polycarbonate block copolymers can be expressed by the average formula

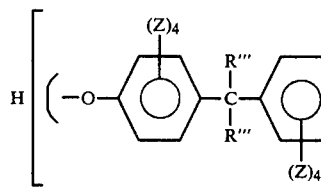 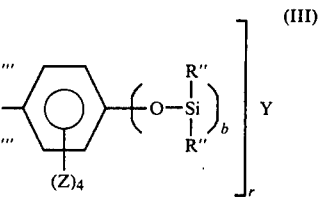

(III)

where r is at least 1, and preferably r is an integer equal to from 1 to about 1000, inclusive, a is equal to from 1 to about 200, inclusive, b is equal to from about 5 to about 200, inclusive, and preferably b has an average value from about 15 to about 90, inclusive, while the ratio of a to b can vary from about 0.05 to about 3, inclusive, and when b has an average value of from about 15 to about 90, inclusive, the ratio of a to b is preferably from about 0.067 to about 0.45, inclusive, Y is

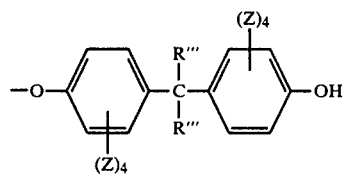

H is a member selected from the class of hydrogen and

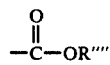

R''' is a member selected from the class of hydrogen, monovalent hydrocarbon radicals and halogenated monovalent hydrocarbon radicals, R'' is a member selected from the class of monovalent hydrocarbon radicals, halogenated monovalent hydrocarbon radicals and cyanoalkyl radicals, R'''' is a member selected from the class consisting of monovalent hydrocarbon radicals and halogenated hydrocarbon radicals, and Z is a member selected from the class of hydrogen, lower alkyl radicals and halogen radicals and mixtures thereof.

Included within the radicals represented by R''' of Formula III are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R''' can be all the same radical or any two or more of the aforementioned radicals, while R''' is preferably methyl, R'' includes all radicals included by R''' above except hydrogen, where R'' can also be all the same radical or any two or more of the aforementioned R''' radicals except hydrogen, and R'' is preferably methyl. R'' also includes, in addition to all the radicals included by R''', except hydrogen, cyanoalkyl radicals such as cyanoethyl, cyanobutyl, etc., radicals. Radicals that are included within the definition of Z of Formula III are hydrogen, methyl, ethyl, propyl, chloro, bromo, iodo, etc., and combinations thereof, and Z is preferably hydrogen.

The block copolymers can be further described as comprising recurring copolymeric units of a polydiorganosiloxane joined by substituted aryloxy-silicon linkages to a polyester of dihydric phenol and a precursor of carbonic acid, where each of said recurring copolymeric units comprises by average weight from about 10% to about 75% of said polydiorganosiloxane, and preferably from about 40 to 70% by weight.

The copolymers of Formula III can be produced by reacting at temperature in the range of 0° C. to 100° C., preferably 20° C. to 50° C., and in the presence of an acid acceptor, a mixture of a halogen chain-stopped polydiorganosiloxane having the formula

and a dihydric phenol having the formula

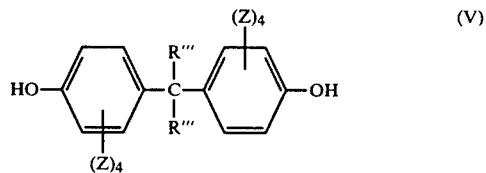

and thereafter phosgenating said reaction product until the resulting copolymer achieves a maximum intrinsic viscosity, where R''', R'', Z and b are as defined above, and X is a halogen radical, preferably chloro.

The organopolysiloxane-polycarbonate block copolymers essentially comprise recurring units consisting of a polydiorganosiloxane interconnected by substituted aryloxy-silicon linkages to a polyester of carbonic acid precursor and a dihydric phenol.

These organopolysiloxane-polycarbonate block copolymers can be used either alone as such or in conjunction with well known modifiers to provide particular desired characteristics.

Illustrative of the above block copolymers is General Electric LR-3320. This material has a specific gravity of 1.12, a tensile strength of 2500 to 3900 psi, an elongation of 230 to 430, a tear strength (Die C) of 400 lbs./in., and a brittleness temperature below −76° F. and a heat deflection temperature (10 mils under 66 psi Load) of 160° F.

Another such block copolymer, specifically General Electric LR-5530, has a specific gravity of 1.07, a tensile strength of 2200 to 2500 psi, an elongation of 500–700%, a tear (Die C) of 200 lbs./in., and a brittleness temperature below −76° F. and a heat deflection temperature (66 psi) of 130° F.

The preferred manner of employing the organopolysiloxane-polycarbonate block copolymer adhesives of the present invention is in the form of film or sheets of about 5 to about 90 mils in thickness, and preferably of about 10 to about 50 mils in thickness. The organopolysiloxane-polycarbonate block copolymer may also be applied to the polycarbonate lamina substrate in the form of a solution in an inert organic solvent. The solvent is then evaporated off and a coating of the copolymer is thereby formed on the surface of the copolymer substrate.

The aminoalkyl[poly(aryloxy siloxane)] primer, which acts as an adhesion promoter, is applied to the surface of either the organopolysiloxane-polycarbonate block copolymer or to the surface of the glass, preferably to the surface of the glass, in layers which are at least monomolecular in depth. Preferably, the thickness of the primer layer ranges from about 0.1 to about 10 microns, and more preferably from about 0.1 to about 1 micron.

The aminoalkyl[poly(aryloxy siloxane)] polymers and their preparation are disclosed in application Ser. No. 962,613, filed Nov. 21, 1978, assigned to the same assignee as the instant application.

These compounds are represented by the general formula

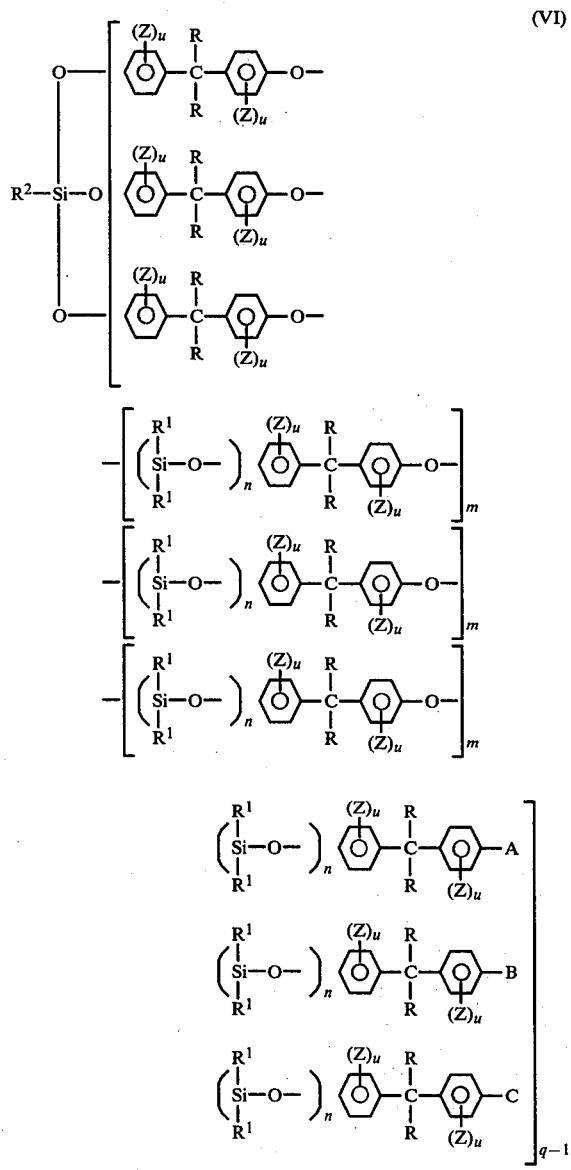

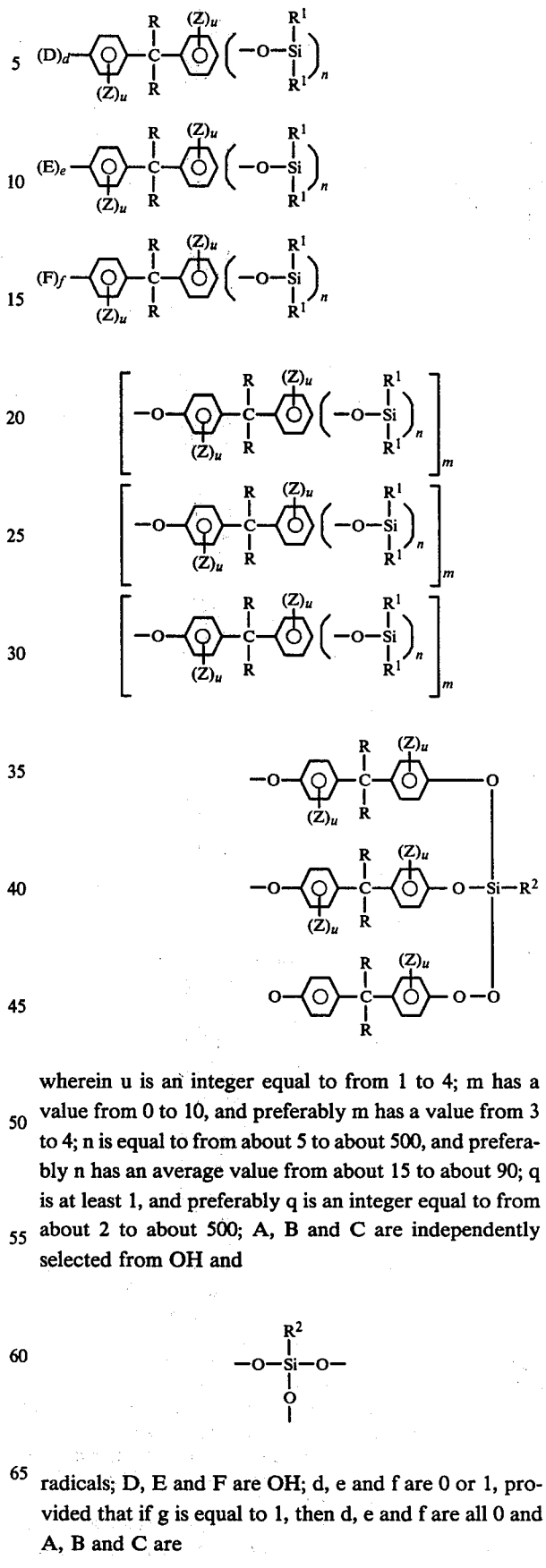

wherein u is an integer equal to from 1 to 4; m has a value from 0 to 10, and preferably m has a value from 3 to 4; n is equal to from about 5 to about 500, and preferably n has an average value from about 15 to about 90; q is at least 1, and preferably q is an integer equal to from about 2 to about 500; A, B and C are independently selected from OH and $$-O-\underset{\underset{O}{|}}{\overset{\overset{R^2}{|}}{Si}}-O-$$

radicals; D, E and F are OH; d, e and f are 0 or 1, provided that if g is equal to 1, then d, e and f are all 0 and A, B and C are

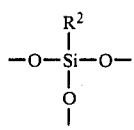

radicals, and further provided that if q is an integer greater than 1, then at least one of A, B and C is a

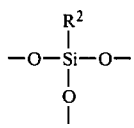

radical and the sum of d+e+f is equal to an integer Y having a value of from 0 to 2 obtained from the formula 3−W=Y wherein W is the number of

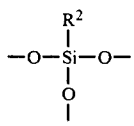

radicals represented by A, B and C; R is a member selected from the class of hydrogen, monovalent hydrocarbon radicals and halogenated monovalent hydrocarbon radicals; $R^1$ is a member selected from the class of monovalent hydrocarbon radicals, halogenated monovalent hydrocarbon radicals, and cyanoalkyl radicals; Z is a member selected from the class of hydrogen, lower alkyl radicals and halogen radicals; and $R^2$ is selected from the class of

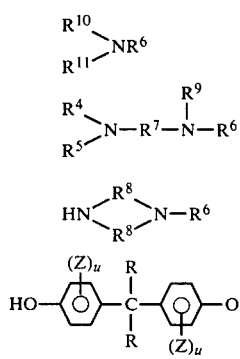

wherein $R^4$, $R^5$ and $R^9$ are independently selected from hydrogen and alkyl radicals, preferably alkyl radicals containing from 1 to about 10 carbon atoms; $R^6$ and $R^7$ are alkylidene radicals, preferably alkylidene radicals containing from 2 to about 8 carbon radicals; $R^8$ is a straight chain alkylidene radical, preferably one containing from 2 to about 4 carbon atoms; and $R^{10}$ and $R^{11}$ are independently selected from hydrogen, alkyl radicals, preferably alkyl radicals containing from 1 to about 10 carbon atoms, $H_2NCO-$, $H_2NCH_2CH_2-$, and $H_2NCH_2CH_2NCH_2CH_2-$.

Included within the radicals represented by R of Formula VI are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned radicals, while R is preferably methyl. $R^1$ includes all radicals included by R above except hydrogen, where $R^1$ also can be all the same radical or any two or more of the aforementioned R radicals except hydrogen, and $R^1$ is preferably methyl. $R^1$ also includes, in addition to all the radicals included by R, except hydrogen, cyanoalkyl radicals such as cyanoethyl, cyanobutyl, etc., radicals. Radicals that are included within the definition of Z of Formula VI are hydrogen, methyl, ethyl, propyl, chloro, bromo, iodo, etc., and Z is preferably hydrogen.

Included within the alkylidene radicals represented by $R^6$ and $R^7$ are $-CH_2CH_2-$, $-CH_2CH_2CH_2-$,

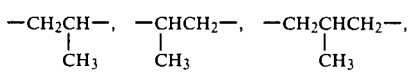

$-CH_2(CH_2)_2CH_2-$, $-CH_2(CH_2)_3CH_2-$,

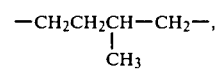

and the like.

Included within the straight chain alkylidene radicals represented by $R^8$ are $-CH_2CH_2-$, $-CH_2CH_2CH_2-$, and $-CH_2(CH_2)_2CH_2-$ with $-CH_2CH_2-$ being preferred.

The compounds of Formula VI are prepared by co-reacting an aminoalkyl alkoxysilane represented by the general formula $$R^2-\underset{\underset{OR^3}{|}}{\overset{\overset{OR^3}{|}}{Si}}-OR^3 \qquad (VII)$$

with a dihydric phenol chain-stopped polydiorganosiloxane oligomer having the formula:

 (VIII)

wherein R, $R^1$, $R^2$, m and n are as defined above, and $R^3$ is an alkyl radical containing from 1 to about 8 carbon atoms.

Examples of compounds represented by formula VII include gamma-aminopropyltriethoxy silane, gamma-aminopropyltrimethoxy silane, N-beta-(aminoethyl) gamma-aminopropyl triethoxy silane, and bis(beta hydroxy methyl) gamma-aminopropyl triethoxy silane.

The oligomers of Formula VIII can be produced by forming at temperatures in the range of 25° C. to 100° C., and in the presence of an acid acceptor, a mixture of halogenated chain-stopped polydiorganosiloxane having the formula:

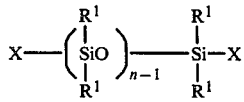

and a dihydric phenol having the formula:

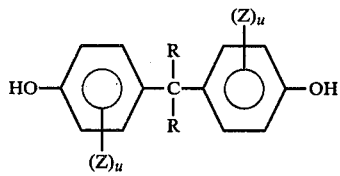

where R, $R^1$, Z, u, n are as defined above, and X is a halogen radical, preferably chloro.

The halogenated chain-stopped polydiorganosiloxane oligomers of Formula IX hereinafter referred to as the oligomers can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507. Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogenated polysiloxane are not critical, generally it has been found desirable to maintain the halogen content of the resulting halogenated polysiloxane in the range of about 0.4 to about 35 percent, by weight, and preferably from about 1 to about 5 percent by weight of said halogenated polysiloxane. The halogenated polysiloxane is preferably in the form of a chlorinate polydimethylsiloxane.

Dihydric phenols that are included in Formula X are, for example, 2,2-bis(4-hydroxyphenyl)-propane (bisphenol-A); 2,4'-dihydroxydiphenylmethane; bis-(2-hydroxyphenyl)-methane; bis-(4-hydroxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis(3-methyl-4-hydroxyphenyl)-propane; 2,2-bis-(3-isopropyl-4-hydroxyphenyl)-propane, etc.

In the practice of the invention, an anhydrous mixture of the halogenated polysiloxane of Formula IX and the polyhydric phenol of Formula X is formed in the presence of a base such as a tertiary amine, for example, pyridine, and at temperatures sufficient to effect reaction. The oligomer reaction product of Formula VIII produced is in the form of a polydiorganosiloxane that is chain-stopped by a substituted aryloxy-silicon linkage with dihydric phenol radicals.

In the production of this oligomer reaction product, it has been found desirable to employ a suitable inert organic solvent in the reaction mixture to facilitate product formation. Suitable organic solvents include chlorobenzene, methylene chloride, etc., while any organic solvent that is inert to the reactants and sufficiently high in boiling point to achieve satisfactory results can be employed. In addition to serving as an acceptor for by-product acid, a tertiary amine can also be employed as a solvent for the reactants, if desired. Suitable tertiary amines include, for example, pyridine, quinoline, tributylamine, etc.

Although the order of addition of the reactants is not critical, it has been found expedient to add the halogenated polysiloxane to an organic solvent solution of the polyhydric phenol and the tertiary amine. Generally, proportions of the halogenated polysiloxane and dihydric phenol that can be employed to form the intermediate reaction product will vary in accordance with the properties desired in the final copolymer. Experience has shown that at least about 0.15 part to about 3 parts of the halogenated polysiloxane, per part of dihydric phenol, can be employed to achieve satisfactory results. The proportions of tertiary amine that are utilized should be at least sufficient to remove all of the by-product acid formed which will very in accordance with the proportions of the reactants employed.

Temperatures in the range of 25° C. to 100° C. can be employed during the formation of the intermediate reaction product while a preferred range is 25° C. to 75° C.

The oligomer thus formed, represented by Formula VIII, is then coreacted with the trifunctional alkoxysilane represented by Formula VII to form the tris[-poly(aryloxysiloxane)] represented by Formula VI. The reaction of the trifunctional alkoxysilane and the difunctional dihydric phenol chain-stopped polydiorganosiloxane is carried out under reaction conditions effective for said trifunctional alkoxysilane to coreact with the difunctional polydiorganosiloxane. Generally, the temperature required for these two reactants to coreact ranges from ambient to about 50° C. The reaction is preferably carried out in the presence of an inert organic solvent. Suitable organic solvents include hexane, chlorobenzene, methylene chloride, etc., while any organic solvent that is inert to the reactants and sufficiently high in boiling point to achieve satisfactory results can be employed.

The amount of reactants employed depends on the degree of branching and crosslinking desired in the polymer. The greater the degree of branching and, therefore, the lesser the degree of crosslinking desired in the polymer, the greater the amount of the difunctional polydiorganosiloxane oligomer is utilized in the reaction mixture. If more crosslinking and less branching in the polymer is desired, then more of the trifunctional silane is utilized in the reaction mixture.

Generally, if K is the number of moles of the oligomer represented by Formula VIII and L is the number of moles of the trialkoxysilane represented by Formula VII, the ratio of K/L falls within the range of from 1.5 to 0.2. The higher this ratio, i.e., the closer the ratio gets to 1.5, the greater the degree of crosslinking of the polymers and, correspondingly, the lesser the degree of branching of the polymer. The lower this ratio, i.e., the closer the ratio gets to 0.2, the lesser the degree of crosslinking and, correspondingly, the greater the degree of branching of the polymer.

Figure 2:
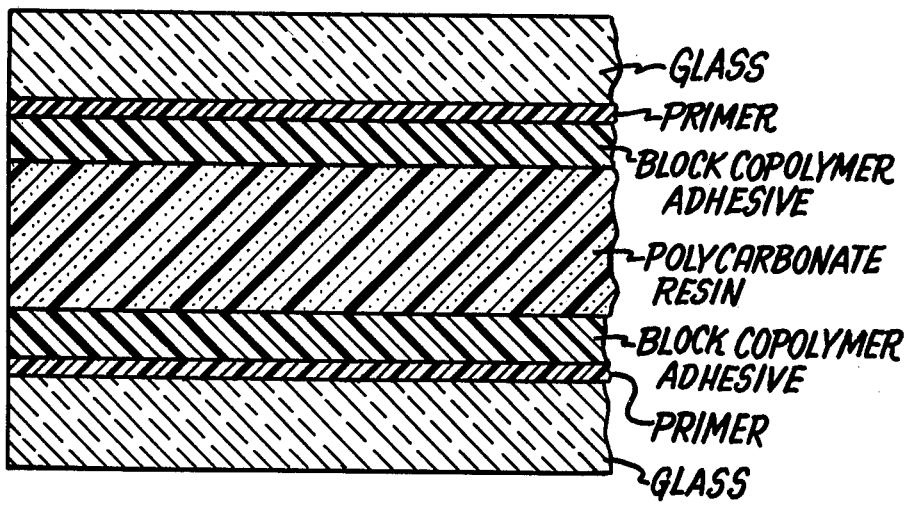
FIG. 2 is a side view of a laminate of the present invention which contains a polycarbonate resin lamina as the core and two outer glass laminae with the primer layer and bonding layer disposed between each of the outer glass laminae and the polycarbonate core.

The laminates of the present invention may consist of a glass ply bonded by means of the instant primer and adhesive to a polycarbonate ply as shown in FIG. 1, or they may consist of a front glass ply bonded by means of the instant primer and adhesive to an intermediate polycarbonate ply which, in turn, is bonded by means of said primer and adhesive to a back glass ply as shown in FIG. 2. In the embodiment wherein the laminate consists of a glass ply bonded to a polycarbonate ply, it is sometimes desirable to provide the outer surface of the polycarbonate, i.e., the surface opposite the glass ply, with an abrasion resistant coating. This is due to the fact that polycarbonate resins are relatively soft materials which are readily scratched and abraded. Therefore, in some applications, where the polycarbonate lamina is subject to being abraded, it is desirable to provide the exposed polycarbonate lamina with a tough and hard abrasion and mar resistant coating. In general, such mar-resistant coatings, which are well known, can be metal oxides; modified melamines; ultraviolet hardenable organics such as acrylated monomers or mixture of these monomers with acrylate-modified polymeric resins; inorganic glasses such as silica or alumina; polyurethanes; silicone resins; silicone resins with recurring organic groups such as polymethyl methacrylate; silica, such as colloidal silica, filled silicone resins; silicone resins derived from epoxy terminated silanes; polyamide ester resins; and, ion-beam deposited carbon, among others, are harder and relatively more scratch and abrasion resistant than the underlying polycarbonate layer which they protect.

These abrasion resistant coatings can be bonded to the polycarbonate lamina during the lamination of the glass lamina to the polycarbonate lamina or they can be applied to the polycarbonate lamina subsequent to such lamination.

In preparing the laminates of the present invention, a layer of the organopolysiloxane-polycarbonate copolymer adhesive is applied between each layer of glass and polycarbonate resin that is to be bonded together and the aminoalkyl[poly(aryloxysiloxane)] primer is applied onto this block copolymer layer or onto the glass layer and the laminae are bonded together under elevated temperature and pressure. The bonding is generally carried out at temperatures of from about 80° C. to about 205° C. and at pressures of from about 10 to about 300 pounds per square inch. The bonding operation may be conducted in any of the commonly employed autoclaves or similar pressurized devices which are generally known to those in the laminating art.

DESCRIPTION OF THE PREFERRED EMBODIMENT

In order to more fully and clearly illustrate the present invention, the following specific examples are presented. It is intended that the examples be considered illustrative rather than limiting the invention disclosed and claimed herein.

EXAMPLE 1

This example illustrates a laminate over which the present invention represents an improvement. A 125 mil thick glass lamina is primed with a 0.5 micron thick layer of N,$\beta$-(aminoethyl)-$\gamma$-aminopropyltrimethoxysilane. This primed glass lamina is bonded to a 250 mil thick lamina of polycarbonate resin by means of a 30 mil thick interlayer of LR-3320 block copolymer in a Carver press employing 200 pounds per square inch of pressure at 130° C. for 30 minutes. This bonding step is followed by a cooling quench under pressure to reduce the temperature to about 75° C.

The following illustrates the preparation of the oligomer represented by Formula VIII. To a vessel equipped with gas inlet tube, condenser and stirrer and outlet stopcock, there are charged 456 parts bisphenol-A and 8,000 parts of methylene chloride. With constant stirring, about 40 parts of gaseous ammonia are added through the gas inlet tube extending below the liquid surface until the bisphenol-A dissolves. There are then added to the mixture, over a period of about 45 minutes, 1535 parts of a chlorinated dimethylpolysiloxane, the stirring is continued for about 15 more minutes, after which 2000 parts of water are added. The mixture is then acidified to a pH of about 6 with concentrated HCl, the mixture, after standing separates into two layers. The organic layer containing the product is recovered from a bottom outlet in the vessel and further purified. The product is obtained as an 18.4 percent solution in methylene chloride.

The following Examples illustrate the preparation of laminates of the present invention.

EXAMPLE 2

To a flask containing 20 cc of hexane are added, with stirring, 4 cc of N,$\beta$-(aminoethyl)-$\gamma$-aminopropyltrimethoxysilane and 1 cc of a dihydric phenol chain-stopped polydiorganosiloxane oligomer prepared substantially in accordance with the procedure set forth above. The resulting mixture is stirred for about 12 hours.

A 125 mil thick glass lamina is coated with this mixture and is air dried to evaporate off a substantial portion of the hexane from the mixture. The resulting primer layer is about 0.3 mil thick. This primed glass lamina is bonded to a 250 mil thick lamina of polycarbonate resin by means of a 30 mil thick interlayer of LR-3320 block copolymer in a Carver press employing 200 pounds per square inch of pressure at 130° C. for 30 minutes. This bonding step is followed by a cooling quench under pressure to reduce the temperature of about 75° C.

EXAMPLE 3

To a flask containing 20 cc of hexane are added, with stirring, 4 cc of N,$\beta$-(aminoethyl)-$\gamma$-aminopropyltrimethoxysilane and 2 cc of a dihydric phenol chain-stopped polydiorganosiloxane oligomer prepared substantially in accordance with the procedure set forth above. The resulting mixture is stirred for about 12 hours.

A 125 mil thick glass lamina is coated with this mixture and is air dried to evaporate off a substantial portion of the hexane from the mixture. The resulting primer layer is about 0.3 microns thick. This primed glass lamina is bonded to a 250 mil thick lamina of polycarbonate resin by means of a 30 mil thick interlayer of LR-3320 block copolymer in a Carver press employing 200 pounds per square inch of pressure at 130° C. for 30 minutes. This bonding step is followed by a cooling quench under pressure to reduce the temperature to about 75° C.

EXAMPLE 4

To a flask containing 20 cc of hexane are added, with stirring, 4 cc of N,$\beta$-(aminoethyl)-$\gamma$-aminopropyltrimethoxysilane and 4 cc of a dihydric phenol chain-stopped polydiorganosiloxane oligomer prepared substantially in accordance with the procedure set forth above. The resulting mixture is stirred for about 12 hours.

A 125 mil thick glass lamina is coated with this mixture and is air dried to evaporate off a substantial portion of the hexane from the mixture. The resulting primer layer is about 0.3 microns thick. This primed glass lamina is bonded to a 250 mil thick lamina of polycarbonate resin by means of a 30 mil thick interlayer of LR-3320 block copolymer in a Carver press employing 200 pounds per square inch of pressure at 130° C. for 30 minutes. This bonding step is followed by a cooling quench under pressure to reduce the temperature to about 75° C.

EXAMPLE 5

To a flask containing 20 cc of hexane are added, with stirring, 4 cc of N,β-(aminoethyl)-γ-aminopropyltrimethoxysilane and 6 cc of a dihydric phenol chain-stopped polydiorganosiloxane oligomer prepared substantially in accordance with the procedure set forth above. The resulting mixture is stirred for about 12 hours.

A 125 mil thick glass lamina is coated with this mixture and is air dried to evaporate off a substantial portion of the hexane from the mixture. The resulting primer layer is about 0.3 microns thick. This primed glass lamina is bonded to a 250 mil thick lamina of polycarbonate resin by means of a 30 mil thick interlayer of LR-3320 block copolymer in a Carver press employing 200 pounds per square inch of pressure at 130° C. for 30 minutes. This bonding step is followed by a cooling quench under pressure to reduce the temperature to about 75° C.

The adhesion of the laminae of the laminates prepared in Examples 1-5 was measured using a test procedure employed by NASA, Goddard Space Flight Center, Green Belt, Maryland, entitled "Peel Resistance of Adhesive Bonds Accurately Measured" and described in Tech. Brief 65-10173 GSSC 320. This test measures the amount of force, in pounds per square inch, required to peel or separate one lamina from another. Briefly, the test involves inserting a sample 10 inches×1 inch in a fixture and affixing the fixture to an Instrom load cell. A force is applied to the end of the sample in a direction 90° to the horizontal axis of the laminate and the amount of force required for delamination to occur is measured. The higher the force required for delamination to occur, the greater the adhesion of the laminae in the laminate. The results of this test are set forth in TABLE I with the adhesion being expressed in the amount of force required to break the adhesive bond between the laminae and cause delamination. It was found that delamination of the laminates occurred between the glass laminae and the block copolymer interlayer. Also recorded in Table I are the times it took for the laminates to fracture when they are removed from the press.

TABLE I

| Example | Adhesion, lb/in. | Time to fracture |
|---------|------------------|------------------|
| 1 | 12.1 | Instantly* |
| 2 | 13.8 | 0.5 hours |
| 3 | 17.1 | 3 hours |
| 4 | 15.9 | 48 hours |
| 5 | 10.8 | 72 hours |

*Laminate spontaneously fractured in the press when the pressure was reduced.

The foregoing results demonstrate that, while the adhesion between the laminae of the laminates produced in accordance with the present invention, i.e., using the primer of the instant invention, is equal or superior to that of the prior art laminates, the stresses present in the laminates of the present invention, which stresses lead to the fracturing of the laminates, are much less than those present in the prior art laminates. Thus, the use of the primer of the instant invention not only improves the adhesion between the laminae but also reduces the stresses present in the laminates.

What is claimed is:

1. An improved laminate of glass and polycarbonate resin wherein the glass and polycarbonate resin layers are bonded together by means of an organopolysiloxane-polycarbonate copolymer adhesive layer disposed between said glass and said polycarbonate resin, the improvement comprising an adhesion promoting primer layer disposed between said glass and said organopolysiloxane-polycarbonate adhesive layer, said adhesion promoting primer layer comprising an aminoalkyl(poly(aryloxysiloxane)) represented by the general formula

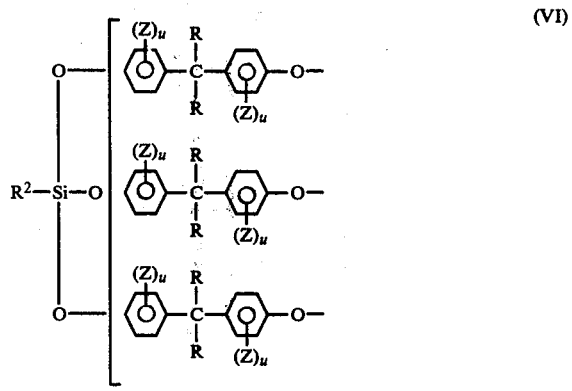

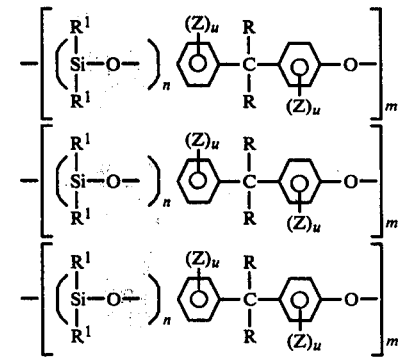

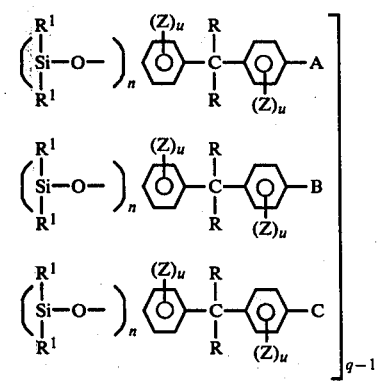

-continued

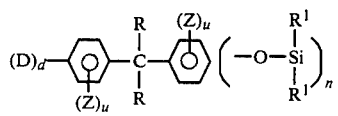

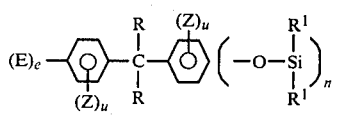

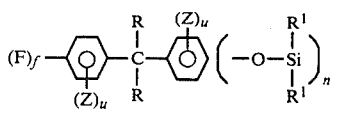

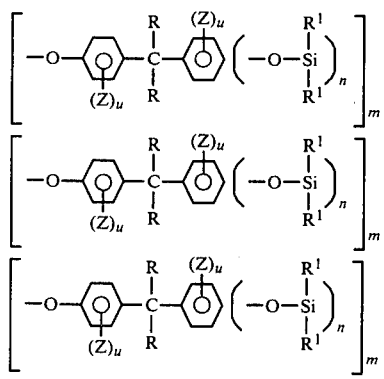

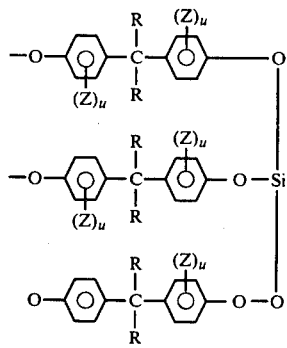

wherein u is an integer equal to from 1 to 4; n has a value of from 5 to about 500, q has a value of from 1 to about 500; m has a value of from 0 to 10; A, B and C are independently selected from OH and

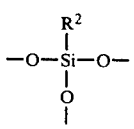

radicals; D, E and F are OH radicals, d, e and f are 0 or 1, provided that if q is 1 then all of d, e and f are 0, and further provided that if q is greater than 1 then at least one 1f A, B and C is a

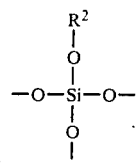

radical and the sum of d+e+f is equal to Y wherein Y has a value of from 0 to 2 which is obtained from the formula 3−W=Y wherein W is the number of

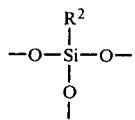

radicals represented by A, B and C; R is a member independently selected from the class of hydrogen, alkyl radicals, and halogenated alkyl radicals; $R^1$ is a member independently selected from the class of alkyl radicals, halogenated alkyl radicals, and cyanoalkyl radicals; Z is a member independently selected from the class of hydrogen, lower alkyl radicals, and halogen radicals; and $R^2$ is a member selected from the class of

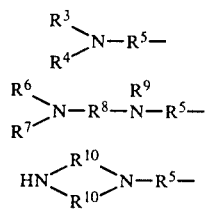

wherein $R^6$, $R^7$ and $R^9$ are independently selected from hydrogen and alkyl radicals, $R^5$ and $R^8$ are independently selected from alkylidene radicals, $R^{10}$ represents a straight chain alkylidene radical, and $R^3$ and $R^4$ are independently selected from hydrogen, alkyl radicals, $H_2NCO-$, $H_2NCH_2CH_2-$, and $H_2NCH_2CH_2NCH_2CH_2-$.

2. The laminate according to claim 1 wherein said organopolysiloxane-polycarbonate copolymer is comprised of (A) from 10 to 75 percent by weight of a polydiorganosiloxane composed of from about 5 to about 200 chemically combined diorganosiloxy units consisting essentially of dialkylsiloxy units which are connected to each other by silicon-oxygen-silicon linkages wherein each of the silicon atoms has two organo radicals attached through a carbon-silicon bond and (B) from 90 to 25 percent by weight of an intercondensation product of a dihydric phenol and a carbonyl halide, where said polydiorganosiloxane and said intercondensation product are joined by aryloxy-silicon linkages.

3. The laminate according to claim 2 wherein $R^2$ is an N-beta-(aminoethyl)gamma-aminopropyl radical.

4. The laminate according to claim 2 wherein $R^2$ is a gamma-aminopropyl radical.

5. The laminate according to claim 2 wherein said primer is disposed on the glass layer.

6. The laminate according to claim 2 comprising a core lamina of polycarbonate resin, two outer laminae of glass, an intermediate bonding layer of said organopolysiloxane-polycarbonate copolymer disposed between each of said outer glass laminae and said core polycarbonate lamina, and a primer layer of said aminoalkyl[poly(aryloxysiloxane)] disposed between said outer glass laminae and said intermediate bonding layers.

7. The laminate according to claim 2 comprising one glass lamina, one polycarbonate lamina, an intermediate bonding layer of said organopolysiloxane-polycarbonate copolymer disposed between said glass lamina and said polycarbonate resin lamina, and a primer layer of said aminoalkyl[poly(aryloxysiloxane)] disposed between said glass lamina and said intermediate bonding layer.

8. The laminate according to claim 7 and further including a hard mar resistant coating bonded to the outer exposed surface of said polycarbonate lamina.

* * * * *